United States Patent [19]

Fischbach

[11] Patent Number: 4,735,190

[45] Date of Patent: Apr. 5, 1988

[54] STEAM-PRESSURE COOKING UTENSIL

[75] Inventor: Wolfgang Fischbach, Daaden, Fed. Rep. of Germany

[73] Assignee: Heinrich Baumgarten KG Spezialfabrik fuer Beschlagteile, Neunkirchen, Fed. Rep. of Germany

[21] Appl. No.: 688,772

[22] Filed: Jan. 4, 1985

[30] Foreign Application Priority Data

Jan. 7, 1984 [DE] Fed. Rep. of Germany ....... 3400356

[51] Int. Cl.$^4$ ............................................. A47J 27/06
[52] U.S. Cl. .................................. 126/377; 220/203; 220/206; 220/316
[58] Field of Search ............... 126/369, 374, 389, 377, 126/388; 99/337, 343, 403, 410; 220/203, 206, 208, 325, 315, 316; 137/505.11, 505.14, 535

[56] References Cited

U.S. PATENT DOCUMENTS

| | | |
|---|---|---|
| 2,565,964 | 8/1951 | Graham et al. . |
| 2,594,584 | 4/1952 | Richeson et al. . |
| 3,973,694 | 8/1976 | Tess ..................................... 220/206 |
| 4,103,801 | 8/1979 | Walker ................................. 220/203 |
| 4,251,007 | 2/1981 | Behnisch ......................... 220/203 X |
| 4,424,915 | 1/1984 | Horn ................................ 220/206 X |

FOREIGN PATENT DOCUMENTS

| | | |
|---|---|---|
| 1779501 | 8/1968 | Fed. Rep. of Germany . |
| 2609302 | 9/1977 | Fed. Rep. of Germany . |
| 2821765 | 12/1978 | Fed. Rep. of Germany . |
| 3027027 | 2/1982 | Fed. Rep. of Germany ...... 126/388 |
| 3223142 | 6/1982 | Fed. Rep. of Germany . |

Primary Examiner—Randall L. Green
Attorney, Agent, or Firm—Flynn, Thiel, Boutell & Tanis

[57] ABSTRACT

A steam-pressure cooking utensil has a utensil and a lid which are both connected with one another by a bayonetlike or similar lock. A cooking and safety valve is arranged in the lid, and includes a valve member which is connected to the lid and a valve which is held pressed against a valve seat by means of a spring. Furthermore, the steam-pressure cooking utensil has a locking mechanism which permits relative rotation of the lid and utensil and thus an opening thereof only after the pressure in the utensil has been removed. In order to permit in the steam-pressure cooking utensil the steam-removal and unlocking, or to permit the closing of the cooking and safety valve and the locking, in a manner assuring that no residual pressure exists in the utensil during opening, the valve is provided with a receiving arrangement, into which extends an operating member which is connected rigidly with the locking mechanism in a manner so that, during an unlocking of the lid and utensil, the valve is automatically lifted off its seat against the spring tension, while during locking of the lid the valve is placed on its seat.

18 Claims, 6 Drawing Sheets

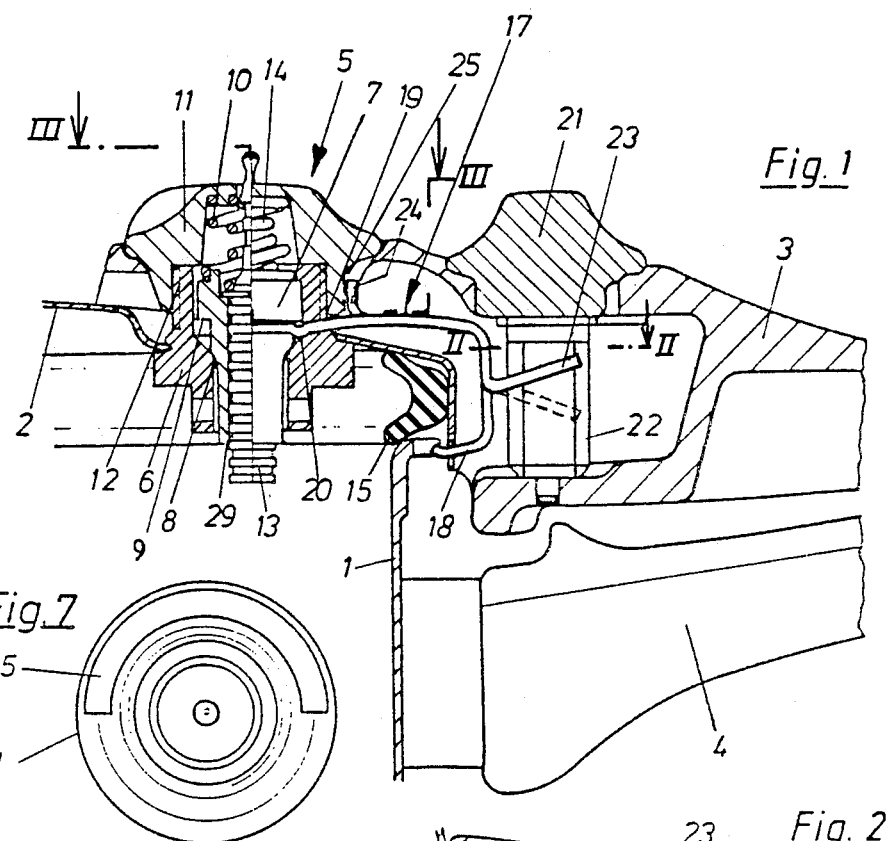

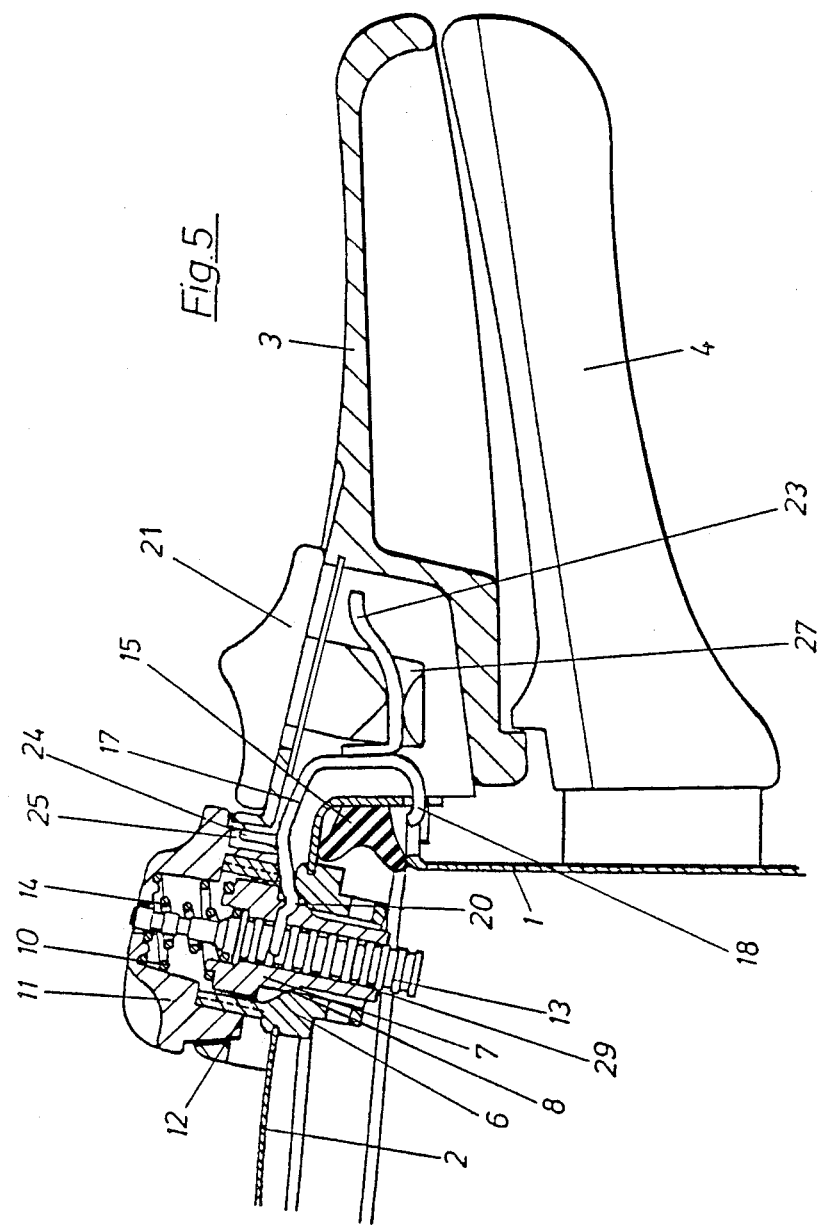

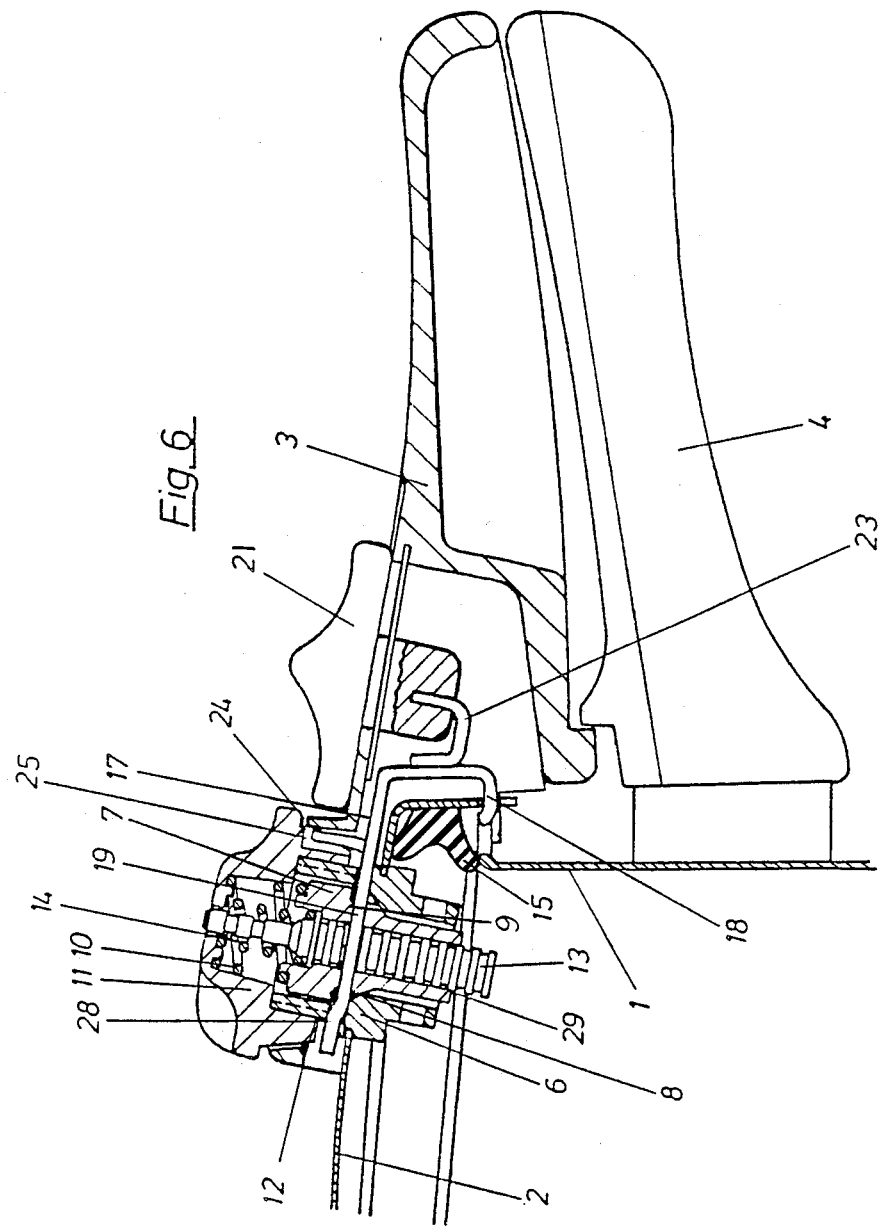

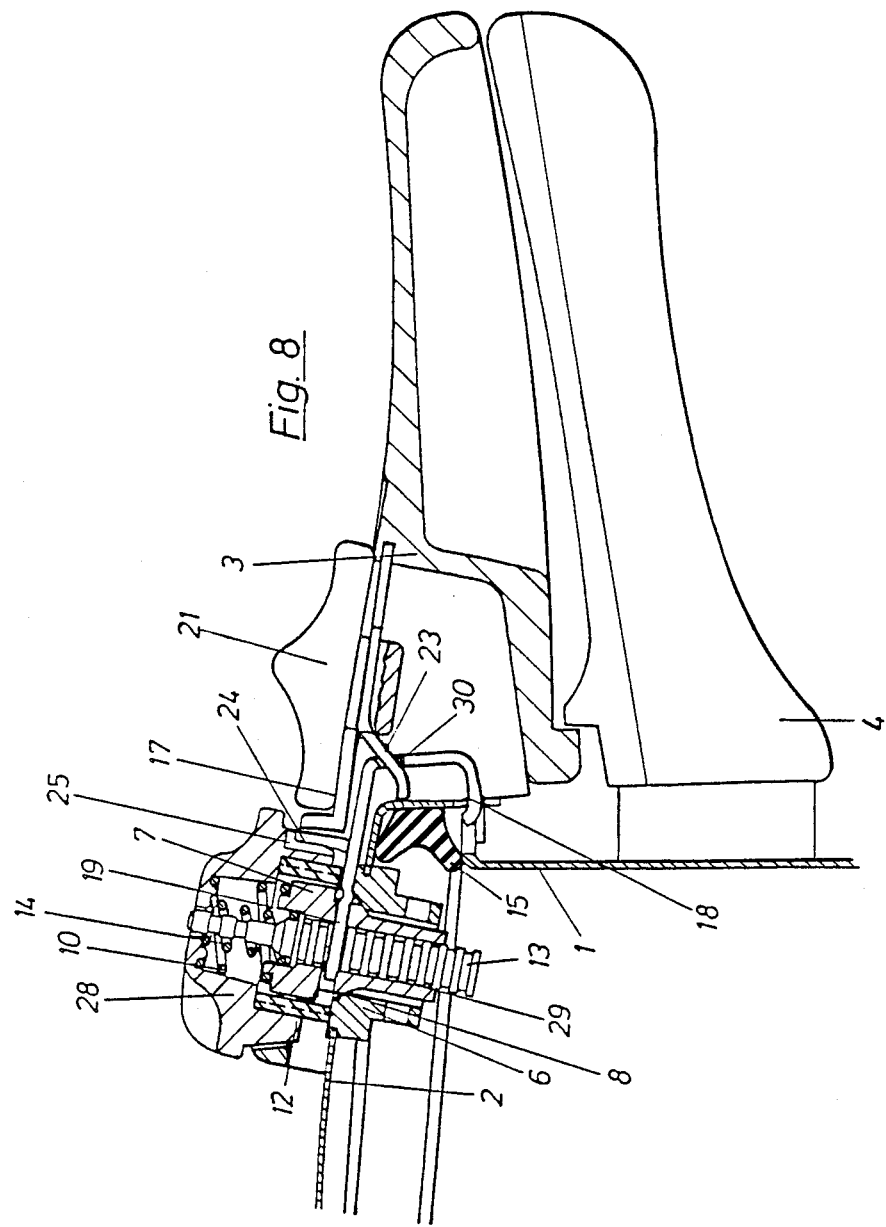

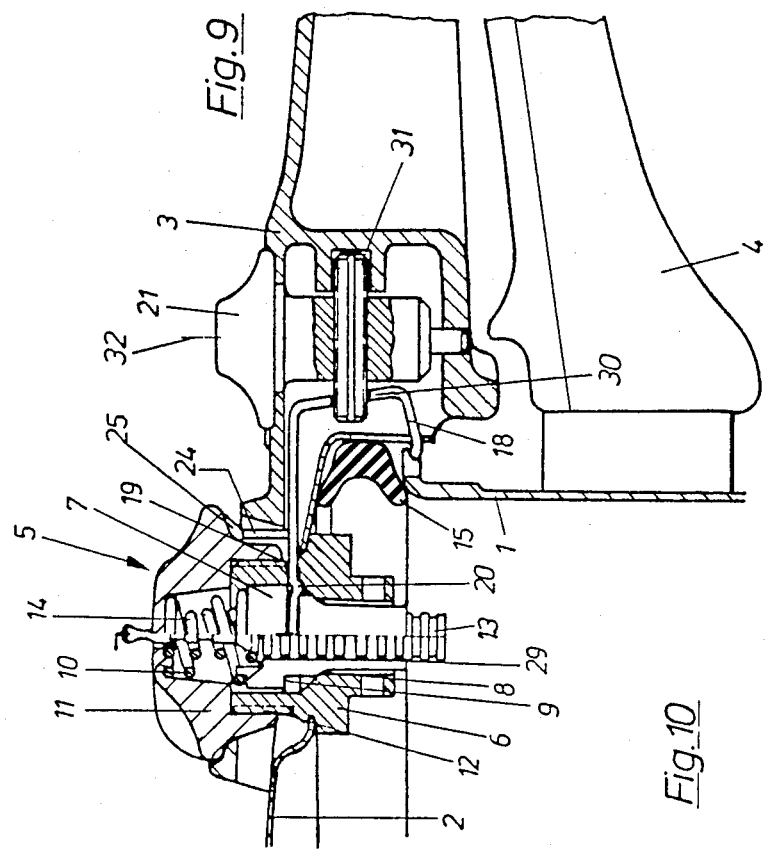
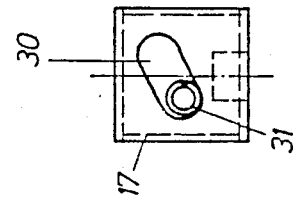

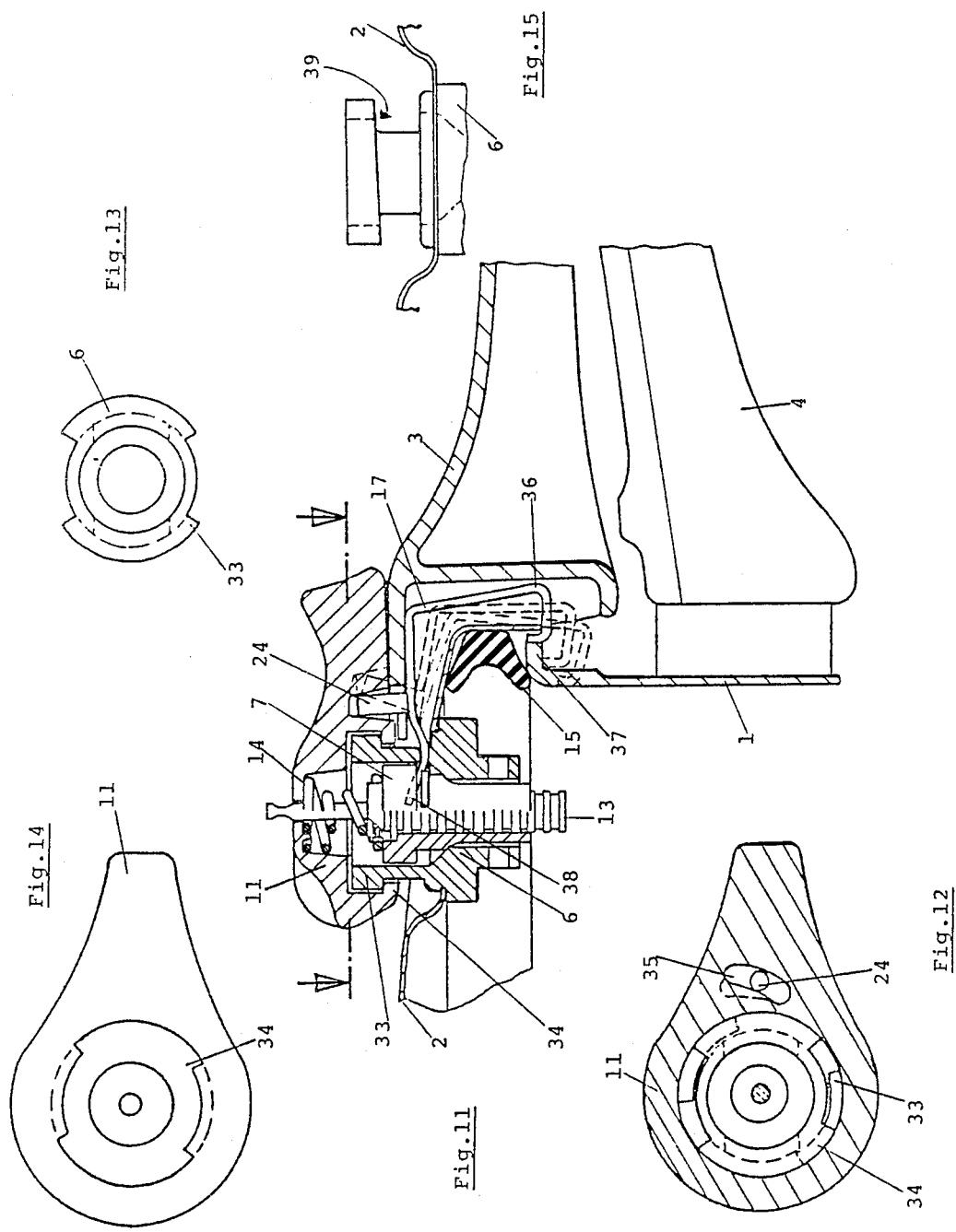

STEAM-PRESSURE COOKING UTENSIL

FIELD OF THE INVENTION

This invention relates to a steam-pressure cooking utensil and, more particularly, to a cooking utensil in which the utensil and lid are connectd with one another by a bayonetlike or similar lock, which includes in the lid a cooking and safety valve having a valve member connected to the lid and a valve pressed against a valve seat by a spring, and which includes a locking mechanism which permits a rotating of the lid and utensil and thus an opening thereof only after the pressure in the utensil has been removed.

BACKGROUND OF THE INVENTION

Certain food which is to be cooked is cooked in steam-pressure cooking utensils under an excess pressure inside of the steam-pressure cooking utensil, so that the steam-pressure cooking utensil must be provided with a safety valve which, at a specific excess pressure, vents steam and thus lowers the pressure in the cooking utensil.

It is known to combine the safety valve with a cooking valve, wherein the spring tension which presses the valve against its valve seat can be varied to adjust for the different cooking stages. This valve thus works as a regulating valve and keeps the pressure in the cooking utensil at a predetermined value. It is furthermore known to also provide such a cooking and safety valve with a cooking indicator, namely a piston which is lifted against a spring force in dependence on the pressure in the steam-pressure cooking utensil and which thus indicates with its markings the level of the pressure in the steam-pressure cooking utensil.

Such a steam-pressure cooking utensil is operated at a high pressure, which means that care must be taken that the steam-pressure cooking utensil cannot be opened under pressure. This safety measure also serves to prevent pressure from building up in the steam-pressure cooking utensil when the lid and utensil are not correctly closed. As a safety measure, a locking pin is provided which can be moved into the bayonet lock of the lid and utensil, so that in this position relative rotation of the lid and utensil is no longer possible.

It is known from German Offenlegungsschrift No. 17 79 501 to extend the control button for the adjustment of the initial tension for the safety and cooking valve and thus for the individual cooking stages, and to let the extended end, during its turning movement into the cooking stage, cooperate with a locking pin which is moved downwardly against a spring force and thus causes a locking or rather a release of the utensil and lid. We are dealing here with a one-button automatic, in which only in the ventilation position of the safety valve can the locking pin permit opening through rotation of the lid on the utensil. This also assures that the safety valve can only be closed when the steam-pressure cooking utensil was properly closed with its bayonet lock, namely when the recess in the utensil edge for receiving the locking pin lies exactly under the pin. This known solution thus offers safety features against an unintended opening and closing of the steam-pressure cooking utensil, but this one-button automatic is also very complicated and thus, on one hand, expensive to manufacture and, on the other hand, susceptible to breakdown during operation, so that breakdowns in operation must be expected in the long run.

A basic purpose of the invention is to suggest a steam-pressure cooking utensil of the above-mentioned type which has a cooking and safety valve and a locking mechanism in which the steam removal and unlocking or the closing of the cooking and safety vavle and the locking is done with an operating button, wherein it is assured that no residual pressure can remain in the utensil, and which is basically simple in design and thus inexpensive to manufacture and also is reliable in operation in the long run. A further purpose involves permitting removal of the safety valve only after the lid has been removed from the utensil.

SUMMARY OF THE INVENTION

This purpose is attained by providing a cooking utensil of the above-mentioned type in which the valve has a receiving arrangement, into which extends an operating member which is connected rigidly to the locking mechanism so that, upon an unlocking of the lid and utensil, the valve is lifted off automatically from its seat against the spring tension, and so that upon locking of the lid, the valve is placed onto its seat.

Thus, the locking pin which effects the locking of the utensil and lid is, in the inventive steam-pressure cooking utensil, connected to an operating member which directly engages the valve and, during movement of the locking mechanism into the locking positin, lifts the valve off its valve seat against a spring tension, so that an automatic ventilation of the steam-pressure cooking utensil occurs. Since the valve is lifted from its valve seat, it is also assured that no residual pressure remains in the steam-pressure cooking utensil. On the other hand, it is also assured by this that pressure in the steam-pressure cooking utensil can only build up after the lid and utensil are closed with one another and the locking mechanism is moved into the locking position.

The operating member for the valve, which operating member is connected to the locking mechanism, is either a seesaw or a slide member and, in the simpliest case, is a U-shaped sheet-metal strip with a longer leg and a shorter leg. The shorter leg serves to lock the utensil and lid together, while the longer leg engages the receiving arrangement of the valve. This receiving arrangement can include slots which are mounted laterally on the valve, or an annular recess. If the operating member is a slide member, the end of the longer leg is provided with a bending or bent section or the like so that, during movement of the operating member approximately perpendicular to the direction of movement of the valve, the operating member is automatically lifted or lowered, depending on whether ventilation is supposed to take place or pressure is supposed to be built up. The shorter leg engages the bayonet between the utensil and lid and is moved together with the other leg so that, on the one hand, a release occurs during ventilation and, on the other hand, a locking of the utensil and lid occurs prior to the pressure build-up and lowering of the valve.

A plate is constructed on the operating member for moving the operating member, which plate cooperates with an adjustment knob which moves the operating member correspondingly. When the operating member is a seesaw, the shorter leg is lowered during the operation of the adjustment knob, so that it disengages from the bayonet of the utensil and the lid, while the front end of the longer leg, which engages the receiving arrangement of the valve, is lifted, wherein the pivot point is provided on the upper leg at a location spaced from the receiving arrangement of the valve.

According to a further suggestion of the invention, the lowering can also be done by means of a rotatable button which is provided with a screw thread, wherein the plate of the operating member engages the threads of the screw member. The plate is advantageously divided in two, so that it engages both sides of the screw thread.

Furthermore, a nose is arranged on the longer leg of the operating member, which nose lies on the side which does not face the lid and cooperates with the rotatable button for the adjusting of the initial tension of the spring of the valve, that is with the rotatable button which adjusts for the cooking stages. A groove is provided for this purpose in the rotatable button, into which groove extends the nose of the operating member when it is in the closed position. The rotation of the rotatable button is limited by this, that is it can only be turned in the region of the cooking stages, whereby it is assured that an unintended turning of the rotatable button out of the cooking position is prevented, which otherwise would result in the steam being able to escape in an explosionlike manner from the utensil.

According to a further suggestion of the invention, the shorter leg of the seesaw is formed so that, in the cooking position, it carries out the lock but, in the venting position, rests already on the utensil wall so that a further swinging of the seesaw is prevented by the utensil wall. The nose which is formed on the balance then extends into the groove which is constructed in the rotatable button, so that removal of the control button and thus the valve from the lid is prevented when the lid is still secured on the utensil. An unintended release of the valve from the utensil is prevented by this.

According to a further suggestion of the invention, the operating button can be eliminated, wherein the control button for holding the valve takes over the task of the operating button. A control groove is arranged for this purpose in the control button, into which control groove extends the nose which is formed on the seesaw. Upon rotation of the control button, the distance of the nose from the axis of rotation of the control button is changed, whereby the seesaw is lifted or lowered, depending on whether a switch from the venting position into the cooking position or vice versa is supposed to take place. The shorter leg of the seesaw is advantageously constructed here so that it rests in the venting position on an outer wall of the utensil and thus prevents a further rotation of the control button, which assures that an unintended release of the valve is prevented. Only after the lid has been removed from the utensil can the control button be further rotated, namely into the position in which it is removed from the valve seat. The connection of the control button and valve seat occurs advantageously through a bayonet connection formed on the valve seat and the control button, so that a removal of the control button from the valve seat is possible only in the release position.

Further advantageous developments of the invention will become evident in connection with the description and drawings.

BRIEF DESCRIPTION OF THE DRAWINGS

Seven exemplary embodiments of the invention will be described in greater detail hereinafter in connection with the drawings, in which:

FIG. 1 is a fragmentary longitudinal sectional view of a part of a steam-pressure cooking utensil which has a cooking and safety valve and a locking mechanism which embody the invention;

FIG. 2 is a sectional view taken along the line II—II of FIG. 1;

FIG. 3 is a sectional view taken along the line III—III of FIG. 1;

FIG. 4 is a view of a valve member of the cooking and safety valve of FIG. 1;

FIG. 5 is a fragmentary sectional view similar to FIG. 1 which illustrates a further exemplary embodiment according to the invention in which the operating member, as in FIG. 1, is constructed as a seesaw;

FIG. 6 is a fragmentary sectional view similar to FIG. 1 which illustrates a further exemplary embodiment of the invention having an operating member which is constructed as a slide member;

FIG. 7 is a bottom view of a control button which is a component of the embodiments of FIGS. 5 and 6;

FIGS. 8 and 9 are fragmentary sectional views similar to FIG. 1 which illustrate two further exemplary embodiments according to the invention;

FIG. 10 is a front view of an operating member and a bushing which are components of the embodiment of FIG. 9;

FIG. 11 is a fragmentary sectional view similar to FIG. 1 which illustrates a further exemplary embodiment according to the invention, in which the control button takes over the function of the operating button of the preceding embodiments;

FIG. 12 is a sectional view taken along the line XII—XII of FIG. 11;

FIG. 13 is a top view of a valve member which is a component of the embodiment of FIG. 11;

FIG. 14 is a bottom view of a control button of which is a component the exemplary embodiment according to FIG. 11; and FIG. 15 illustrates an alternative embodiment of a valve member of the embodiment of FIG. 11 which is built into the lid.

DETAILED DESCRIPTION

The steam-pressure cooking utensil which is illustrated in FIG. 1 includes a utensil 1 and a lid 2. A handle part 4 is mounted on the utensil 1, and a handle part 3 is mounted on the lid 2. The closing position of the lid 2 and utensil 1 is reached when both handle parts 4 and 3 lie one on top of the other.

A cooking and safety valve 5 is provided in the lid 2.

The safety valve 5 includes a valve member 6 and a valve 7 which is arranged movably therein. The valve 7, in the illustrated position, rests on a seat 8 of the valve member, so that no steam can escape from the inside of the steam-pressure cooking utensil. The valve 7 is held in this position by a biasing spring 10, wherein the spring initial tension is adjusted by a control button 11, which is screwed onto an external thread 12 of the valve member 6.

The valve 7 is provided with a bore 29, in which a pressure indicator 13 is supported for movement against the urging of a spring 14. When pressure has built up inside of the steam-pressure cooking utensil, the pressure indicator 13 is lifted so as to project further from the control button 11, wherein the magnitude of the pressure in the steam-pressure cooking utensil is indicated by rings on the pressure indicator.

A seal 15 is inserted in a conventional manner into the edge of the lid 2, and seals off the utensil and lid with respect to one another.

A recess in the form of a pair of slots 16 is arranged in the valve 7, through which slots extend two longer legs 19 of an operating member 17, which legs act onto a shoulder 9 of the valve 6. The operating member is U-shaped in a side view, and has a shorter leg 18 and a longer leg 19 connected by a bight. The shorter leg 18 serves at the same time as a locking member and engages the bayonetlike lock between the utensil 1 and lid 2. This prevents in a conventional manner relative rotation of the lid and utensil.

The operating member 17 is constructed as a seesaw, on in other words is pivotally supported and pivots with its longer leg 19 about a point 20. An operating button 21 is used to pivot the operating member 17, which button 21 is constructed as a control button in the exemplary embodiment according to FIG. 1 and is arranged in the upper handle part 3. The operating button 21 has a screw thread 22, the threads of which are engaged by a plate 23 which is connected to the bight of the operating member 17. The plate 23 is divided into two spaced parts (FIG. 2) and engages on both sides the threads of the screw 22. Rotation of the operating button 21 causes the plate 23 and thus the operating member 17 to pivot about the pivot point 20, wherein during a downward movement of the plate the valve 7 is lifted from its seat 8 and the locking member 18 disengages from the bayonet lock of the utensil and lid. In reverse, during upward movement of the plate 23, a locking of the utensil and lid and a lowering of the valve 7 onto its seat 8 is achieved. The shoulder 9 in the valve 7 is thereby designed sufficiently large so that, when the valve is lowered, it can operate in a normal manner as a cooking and safety valve.

A nose 24 is arranged on the longer leg 19 of the operating member 17 and swivels together with the operating member. The nose cooperates with a groove 25 in the control button 11, wherein the groove extends circumferentially less than 360° in the control button 11. This assures that the control button 11, when the valve 7 is closed and the utensil is locked, can be rotated only for a specific angular amount to change the initial tension of the spring 10 and thus the adjustment of the individual cooking stages. On the other hand, this prevents the control button 11 from being turned off completely so that, during an excess pressure in the steam-pressure cooking utensil, the valve 7 is ejected upwardly.

The operating member 17, of which an integral part is the locking member 18, thus is made of a U-shaped piece of bent sheet metal and can be manufactured inexpensively. Moreover, an automatic coupling of the valve position and the locking is achieved through this, wherein the operation is done by a control button, as is illustrated in FIGS. 1 and 3, or by a push button 21, as is illustrated in FIG. 5. In the exemplary embodiment according to FIG. 1, like that according to FIG. 5, the operating member 17 is constructed as a seesaw. If one compares the inventive steam-pressure cooking utensil and its safety mechanism with conventional pressure cooking utensils with their extremely complicated safety mechanisms, which are susceptible to trouble, then it becomes apparent that both have the same functions, but in contrast to the known ones it is also assured that a residual ventilation of the steam-pressure cooking utensil is assured by a lifting of the valve, and the construction is substantially simpler.

In the exemplary embodiment according to FIG. 5, similar parts are provided with the same reference numerals used above. In this exemplary embodiment, the operating member is again a seesaw which pivots about a point 20. The plate 23 which is connected to the operating member 17 is constructed slightly arc-shaped and extends through a guideway 27 in the operating button 21. The curvature of the plate is adapted to the direction of the path of movement of the operating button 21 such that, upon sliding movement of the operating button to the right in the drawing, a lowering of the plate 23 and thus a release movement of the locking member 18 and a lifting of the valve 7 occurs. Upon movement of the operating button 21 in the opposite direction, the valve is again lowered onto its valve seat 8 and the locking member 18 engages the bayonet lock of the lid and utensil, so that relative rotation of lid and utensil is impossible. On the other hand, the operating member 17 can be moved forwardly only when the utensil and lid lie correctly one above the other, that is are closed correctly, otherwise the locking member 18 of the operating member 17 hits a projecting part of the bayonet lock. The result in such a situation is that the valve 7 is not lowered and pressure thus cannot build up in the steam-pressure cooking utensil.

In the exemplary embodiment which is illustrated in FIG. 6, similar parts are identified with the same reference numerals used above. This exemplary embodiment differs from the two preceeding ones in that the operating member 17 is constructed as a slide member. The operating member 17 is moved by an operating button 21, into which the plate 23 extends form-lockingly. The front end of the longer leg 19 is provided with a bent section 28. The position illustrated in FIG. 6 is the cooking position, namely, the valve 7 is lowered onto its valve seat 8 and the locking member 18 locks the utensil and lid against relative rotation. If the utensil is to be opened, then the operating button 21 is moved from the illustrated position to the right, wherein the bent section 28 grips under the annular shoulder 9 of the valve 7, which causes the valve to be lifted off from its seat 8 and the pressure in the utensil to be completely removed. The locking member simultaneously releases the utensil and lid, so that the utensil can subsequently be opened without any danger of injury due to hot steam.

In the exemplary embodiment which is illustrated in FIG. 8, similar parts have the same reference numerals used above. The operating member 17 is also constructed in this exemplary embodiment as a seesaw. The difference between this exemplary embodiment and the exemplary embodiment according to FIG. 5 substantially involves the plate 23 being connected fixedly to the operating button 21 and engaging a guideway 30 which is provided in the operating member 17. The shape of the guideway and the shape of the plate 23 are adjusted to one another so that, during movement of the operating button 21 to the right in FIG. 8, a lowering of the shorter leg 18 and a lifting of the longer leg 19 occurs, which causes on the one hand the lid and utensil to be unlocked and on the other hand the valve 7 to be lifted off from its seat 8.

In the exemplary embodiment according to FIGS. 9 and 10, similar parts have the same reference numerals used above. The operating member 17 is also constructed as a seesaw and pivots about the pivot point 20. An operating button 21 is used to pivot the operating member 17, and the operating button 21 is constructed as a control button and can be rotated about a vertically lying axis 32 in the handle part 3. A bushing or pin 31 extends perpendicular with respect to the axis 31 through the operating button 21, and engages a guideway or slot 30 in the operating member 17. The guideway 30 is inclined with respect to the direction of movement of the bushing 31 (FIG. 10) so that, upon rotation of the operating button 21, the operating member 17 is lifted or lowered, with the result that the utensil is locked and the valve 7 released, or the utensil is unlocked and the valve 7 is lifted off from its seat 8.

In the exemplary embodiments according to FIGS. 11 to 14, similar parts have the same reference numerals used above. The difference between the exemplary embodiments according to FIGS. 11 to 14 and the previous embodiments is that the operating button 21 is omitted and the function of the operating button is performed by the control button 11. A further difference is that the fastening of the control button 11 on the valve member 6 is not effected by a screw thread, but by a bayonet lock 33 and 34, wherein the fastening position and the release position are arranged with respect to one another such that a rotation of the control button 11 in the locking and also the steam release position is easily possible without any danger of a release of the control button 11 and the valve member 6. Moreover, a further rotation of the control button 11 in the locking position can exist, namely when with the cam control button different cooking positions are supposed to be possible. In this case, cam plates 39 are constructed on the valve member and, during rotation, permit a tensioning or relaxing of the spring 14.

The nose 24 on the operating member 17 engages a guide groove 35, which is constructd in the control button 11 so as to cause the distance of the nose 24 from the pivot point of the control button 11 to change during the rotation. This results in a swivelling of the operating member 17, as is illustrated with one solid-line position and two dashed-line positions in FIG. 11. The cooking position is represented by the solid-line position of the operating member 17. The end 36 of the operating member 17 engages here the edge of the utensil 1, so that the utensil 1 and lid 2 are locked against rotation relative to one another. When the cooking operation is to end, the operating button 11 is rotated and moves the member 17 so that the end 36 grips under the edge 37 of the utensil 1, as shown in the upper dashed-line position of the operating member 17. The front end 38 of the operating member 17 is lifted at the same time, which causes the valve 7 to be lifted off from its valve seat and the venting operation to start. A further rotation of the control button 11 to a position in which the valve 7 can be removed is not possible, bacause the end 36 prevents a further rotation. Only during a pressureless condition, when the lid 2 has been removed from the utensil 1, can the control button be further rotated until the end 36 of the operating member 17 assumes the position which is illustrated in the lower dashed-line position in FIG. 11. The bayonet lock between the valve member 6 and control button 11 can be released in this position and the valve can be removed for cleaning.

This additional function of the lock for the removal of the valve from a lid which is mounted on the utensil is possible in a similar manner in the exemplary embodiments with a separate operating button 21. Care must only be taken here that the nose 24 comes out of the groove 25 of the control button 11 only after the lid and utensil are separated.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows 1. A steam-pressure cooking utensil in which the utensil and lid are connected by a bayonetlike or similar lock, comprising a cooking and safety valve which is arranged in the lid and has a valve member which is connected to the lid and a valve which is urged toward a valve seat by a biasing element, and a locking mechanism which permits a rotating of the lid and utensil and thus an opening thereof only after the pressure in the utensil has been removed, wherein the valve is provided with receiving means into which extends an operating member which is connected rigidly to the locking mechanism so that, upon an unlocking of the lid and utensil, the valve is lifted automatically from its seat against the urging of the biasing element, and so that, upon locking of the lid, the valve is placed onto its seat, and wherein the operating member is substantially U-shaped, has a short leg which is a part of the locking mechanism, has a longer leg which engages the receiving means on the valve, and has a bight which connects the short leg and the longer leg.

2. A steam-pressure cooking utensil according to claim 1, wherein the receiving means on the valve includes laterally arranged slots which lie above the valve seat.

3. A steam-pressure cooking utensil according to claim 1, wherein the cooking and safety valve includes a pressure indicator.

4. A steam-pressure cooking utensil according to claim 1, wherein the locking mechanism can prevent relative rotation of the lid and utensil through direct engagement with the bayonetlike lock, wherein the receiving means on the valve includes at least one slot which receives the longer leg of the operating member, and wherein the shorter leg of the operating member is the locking mechanism.

5. A steam-pressure cooking utensil according to claim 1, wherein the biasing element is a helical compression spring.

6. A steam-pressure cooking utensil according to claim 1, wherein the operating member is a seesaw and has a pivot point in the region of the longer leg.

7. A steam-pressure cooking utensil according to claim 6, including a bushing or plate which engages the bight of the operating member and can be moved by means of an operating button.

8. A steam-pressure cooking utensil according to claim 7, wherein the operating button is constructed as a rotatable control button, and wherein the bushing is arranged in the control button is arranged perpendicular to its axis of rotation and engages an inclined guideway provided in the operating member.

9. A steam-pressure cooking utensil according to claim 7, wherein the operating button is constructed as a slide member and the plate is slidably received in a guideway in the operating button or a guideway in the operating member.

10. A steam-pressure cooking utensil according to claim 7, wherein the operating button is constructed as a control button having a screw thread which is engaged by the plate.

11. A steam-pressure cooking utensil according to claim 10, wherein the plate is forked and engages opposite sides of the thread of the control button.

12. A steam-pressure cooking utensil according to claim 1, wherein the operating member is constructed as a slide member, and wherein a front end of the longer leg, which cooperates with the valve, is provided with a bent section, reinforcement or the like which, during movement of the operating member, cooperates with a shoulder of the receiving means of the valve so that the valve is lifted or lowered.

13. A steam-pressure cooking utensil according to claim 12, wherein an adjustment knob engages a plate of the operating member and causes, directly or through eccentrics, movement of the operating member.

14. A steam-pressure cooking utensil according to claim 1, wherein the biasing element is a spring, including a nose which is arranged on the operating member and cooperates with a groove in a movable control button which adjusts an initial tension of the spring of the cooking and safety valve, wherein when the valve is closed and the utensil and lid are locked, the nose cooperates with ends of the groove to limit movement of the control button and thereby limit the initial tension of the spring to values appropriate for cooking.

15. A steam-pressure cooking utensil according to claim 14, wherein an end of the operating member is formed so that, in the steam-removal position, the end rests on the wall of the utensil, and wherein the nose in this position extends into the groove in the control button.

16. A steam-pressure cooking utensil according to claim 1, wherein the biasing element is a spring, and wherein a control button is connected to the valve member by a further bayonet lock, the control button supporting an end of the spring which is remote from the valve.

17. A steam-pressure cooking utensil according to claim 16, wherein a nose is guided in an arcuate guide groove which is constructed in the control button and which lies eccentrically with respect to the pivot axis of the control button.

18. A steam-pressure cooking utensil according to claim 16, wherein the further bayonet lock permits rotational movement of the control button relative to the valve member and includes cam plates which are provided on the valve member and which engage the control button, wherein as the control button is rotated relative to the valve member the cam plates effect axial movement of the control button relative to the valve member and thereby vary an initial tension of the spring.

* * * * *

UNITED STATES PATENT AND TRADEMARK OFFICE
CERTIFICATE OF CORRECTION

PATENT NO. : 4 735 190

DATED : April 5, 1988

INVENTOR(S) : Wolfgang FISCHBACH

It is certified that error appears in the above-identified patent and that said Letters Patent is hereby corrected as shown below:

Column 8, Line 61; delete "is arranged".

Signed and Sealed this

Twenty-seventh Day of September, 1988

Attest:

DONALD J. QUIGG

Attesting Officer

Commissioner of Patents and Trademarks